C. C. GLEASON.
Carriage-Spring.
No. 50,114. Patented Sept. 26, 1865.
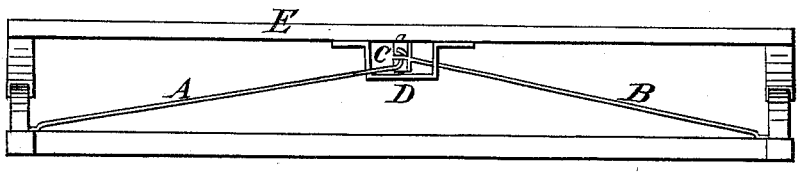
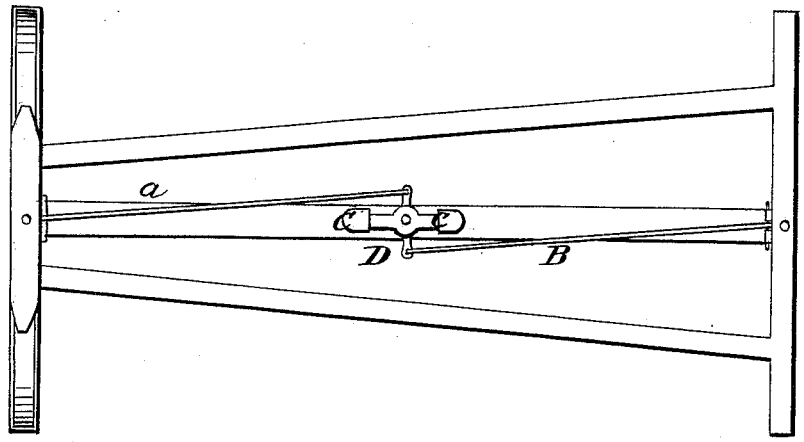
Witnesses:
J Clement Smith
Fred B. Ginn
Inventor:
C C Gleason
By
D. E. Somes & Co.
Attorneys

UNITED STATES PATENT OFFICE.

CHRISTOPHER C. GLEASON, OF WAUCONDA, ILLINOIS.

IMPROVEMENT IN BRACES FOR CARRIAGE-SPRINGS.

Specification forming part of Letters Patent No. 50,114, dated September 26, 1865.

*To all whom it may concern:*

Be it known that I, CHRISTOPHER C. GLEASON, of Wauconda, in the county of Lake and State of Illinois, have invented a new and useful Improvement in Braces for Supporting Carriage-Springs, Carriage Bodies and Seats; and I do hereby declare that the following is a full, clear, and exact description of the construction and operation of the same, reference being had to the annexed drawing, making a part of this specification, and to the letters of reference marked thereon.

The object of my invention is to provide means for preventing elliptic springs of vehicles from becoming bent or broken by the forward and backward movements of the body of the vehicle, and also to prevent such vehicle-bodies from being strained or broken by said movements.

It is well known that elliptic springs of vehicles are frequently bent and broken by the weight of the body of the vehicle falling obliquely upon one spring while passing over log bridges, stones, or ruts, or even while passing up and down declivities in the road; and it is also well known that the bodies of such vehicles are often strained and broken while encountering such obstructions to travel, particularly if there be a heavy load therein.

To remedy this evil, I construct two braces of iron rods, one of which is attached firmly at one end to the bottom of the forward spring, at the center thereof, and the other is attached in the same manner to the rearward spring. These braces are marked A and B, respectively, on the drawing, and they are connected at or near the center of the bottom of the body of the vehicle in the manner following, namely; I attach to the bottom of the body of the vehicle, near its center, a strong collar, (marked C.) In this collar I place a horizontally-vibrating lever with two arms, as represented by the letter D, and the connection between the braces A and B is formed by attaching the rear end of the brace A and the forward end of the brace B, respectively, to the ends of said arms.

In the drawing, the line marked E represents the body of the vehicle.

My device operates as follows: Whenever, in passing over an obstruction or up or down a hill, the weight of the load would otherwise fall in an oblique manner, either upon the forward or rearward spring, it is arrested by the said braces, respectively, and by them communicated to the axle of the vehicle.

My device of the vibrating lever D serves to allow free action to the springs of the vehicle in an upward or downward direction, and at the same time operates as a firm rest, stop, and connection for said braces, while they act to prevent a to-and-fro movement of the body of the vehicle.

The braces A and B may be placed at right angles with the body of the vehicle under the seat, whenever the springs thereof may need support, and thereby the same protection will be extended to said springs and seat as is secured by them to the springs and body of the vehicle.

I do not claim the invention of the braces and revolving lever, broadly, as they have heretofore been used.

What I claim as my invention, and desire to secure by Letters Patent, is—

The specific arrangement and adjustment as described, to wit: attaching the revolving lever to the bottom of the carriage-box, and attaching the braces to said lever and front and rear axles, substantially as set forth.

CHRISTOPHER C. GLEASON.

Witnesses:
ROBERT HARRISON,
H. S. TRUMBULL.